United States Patent [19] [11] 4,022,862

McBride et al. [45] May 10, 1977

[54] METHOD OF MOLDING AN ARTICLE IN AN EXPANSIBLE MOLD AND REMOVING THE ARTICLE FROM THE MOLD

[75] Inventors: Donald W. McBride, Independence, Mo.; Richard L. Glenn, Overland Park, Kans.; Barry A. Cooper, Wayzata, Minn.

[73] Assignee: Hallmark Cards, Incorporated, Kansas City, Mo.

[22] Filed: Apr. 12, 1976

[21] Appl. No.: 675,980

Related U.S. Application Data

[63] Continuation-in-part of Ser. No. 551,756, Feb. 21, 1975, abandoned.

[52] U.S. Cl. .............................. 264/271; 264/313; 264/334

[51] Int. Cl.² ...................... B29C 7/00; B29D 3/00

[58] Field of Search .......... 264/299, 271, 313, 314, 264/259, 334, 335; 425/803, DIG. 44, 117, 125, 144; 431/288

[56] References Cited

UNITED STATES PATENTS

| | | | |
|---|---|---|---|
| 2,122,451 | 7/1938 | Cassimatis | 264/313 |
| 2,310,019 | 2/1943 | Hamblet | 431/288 |
| 2,863,215 | 12/1958 | Lane | 425/144 |
| 3,153,814 | 10/1964 | Ohrenberger | 425/144 |
| 3,166,792 | 1/1965 | Goldfarb | 425/803 |
| 3,702,495 | 11/1972 | Renoe | 29/428 |
| 3,759,478 | 9/1973 | Schmitt et al. | 249/93 |
| 3,815,863 | 6/1974 | Andeweg | 249/178 |

*Primary Examiner*—Willard E. Hoag

*Attorney, Agent, or Firm*—Schmidt, Johnson, Hovey & Williams

[57] ABSTRACT

A commercially feasible method is provided for molding high quality seamless, irregularly shaped articles such as wax candles which are essentially free of surface defects and other molding imperfections by provision of relatively thin-walled, self-sustaining but distensible molds having high heat transfer properties, in conjunction with mold-receiving housing structure including liquid delivery, circulation and removal apparatus for supporting the molds against perceptible distension under the weight of molding material while accelerating solidification of the wax, and for inducing distension of the molds by the technique of removing only a small portion of the cooling liquid without creating significant liquid-free voids in the mold tank. Thus, the method hereof avoids the necessity of complete draining of the mold tank during each molding cycle which in turn speeds the process and renders it more economical. In preferred forms of candle-making, the mold cavities are preheated with hot air to prevent premature solidification of wax therein to ensure complete and even flow of wax throughout the mold, while also facilitating the escape of any air entrained within the complex surface contours of the mold. Novel apparatus is also provided for supporting the molds in the housing structure, positioning a prefabricated central wax core or plug within the mold cavities, and for premitting essentially automatic wick installation during the candle molding operation itself. Self-extinguishing candles are also disclosed wherein the wicks thereof terminate above the candle base to preclude complete burning of the candle.

14 Claims, 20 Drawing Figures

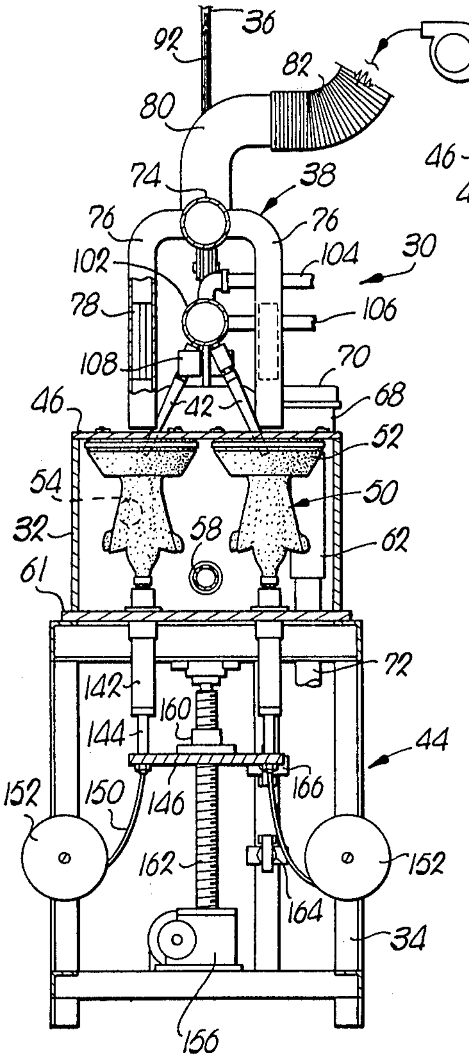
Fig.2.
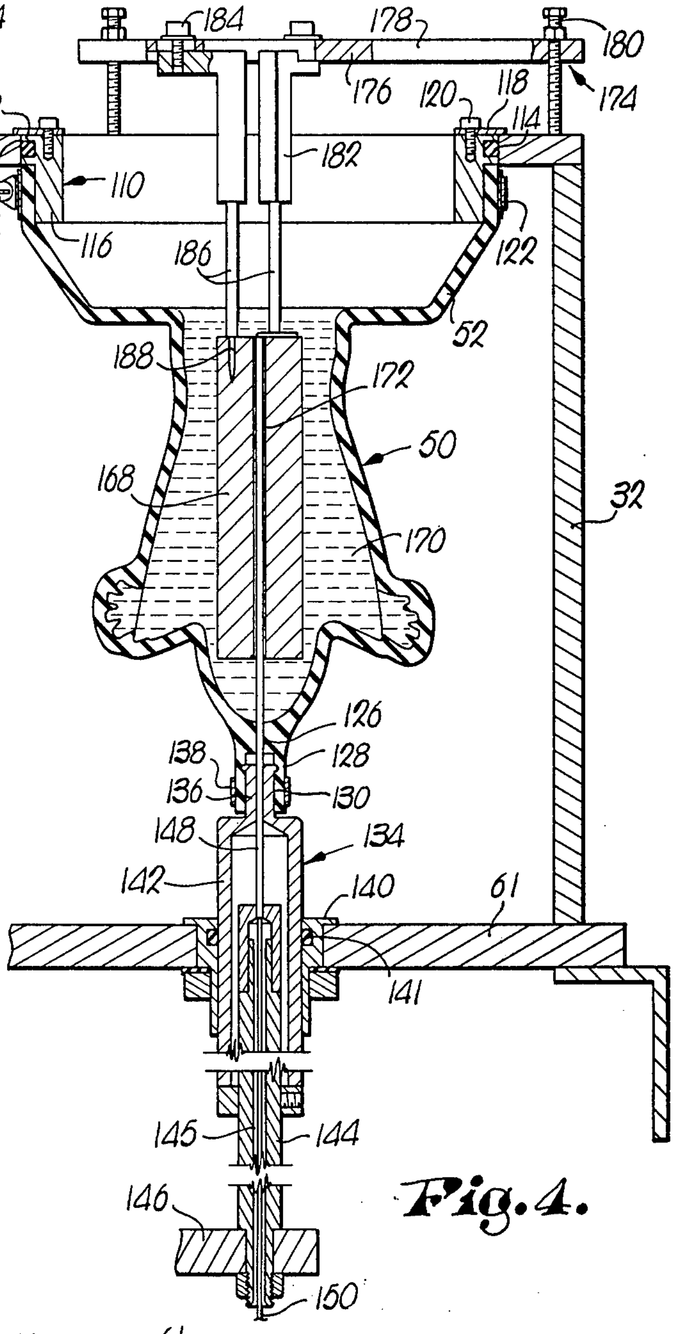
Fig.4.
Fig.3.
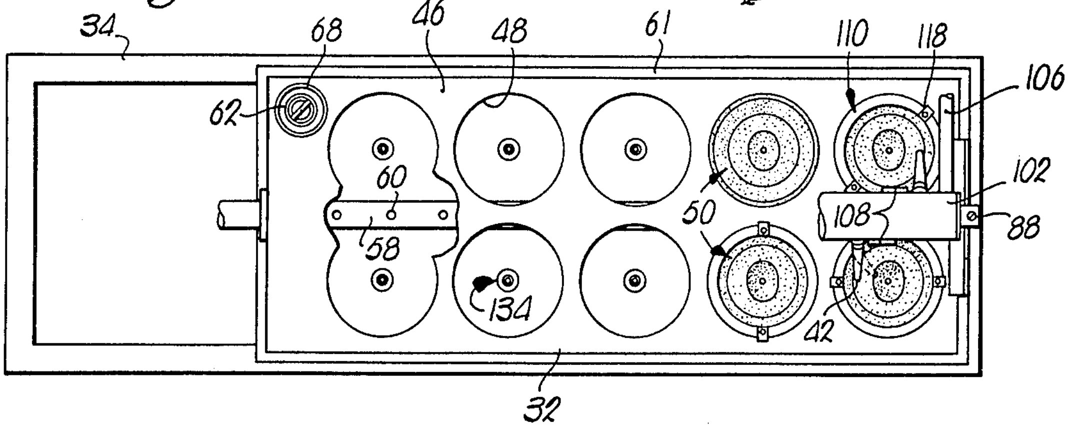

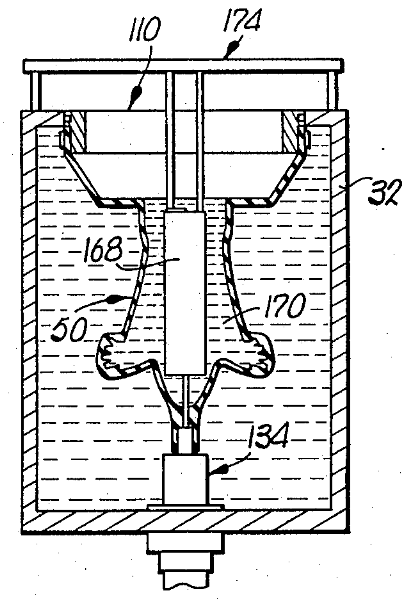
Fig. 16.
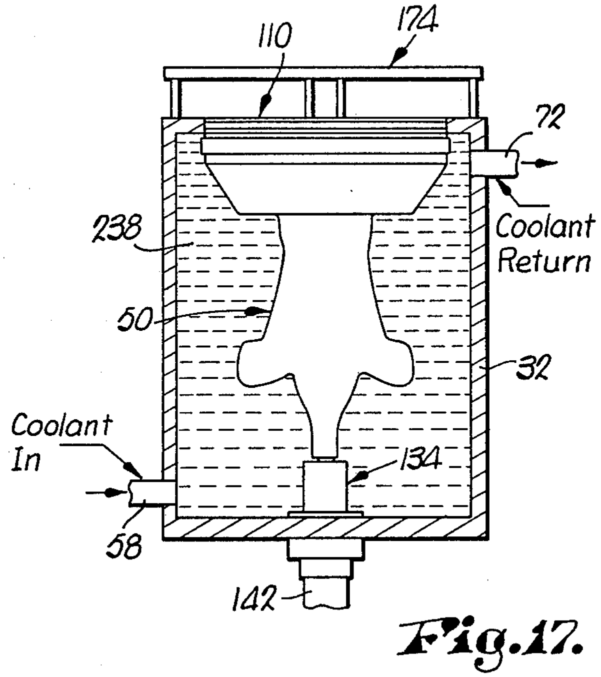
Fig. 17.
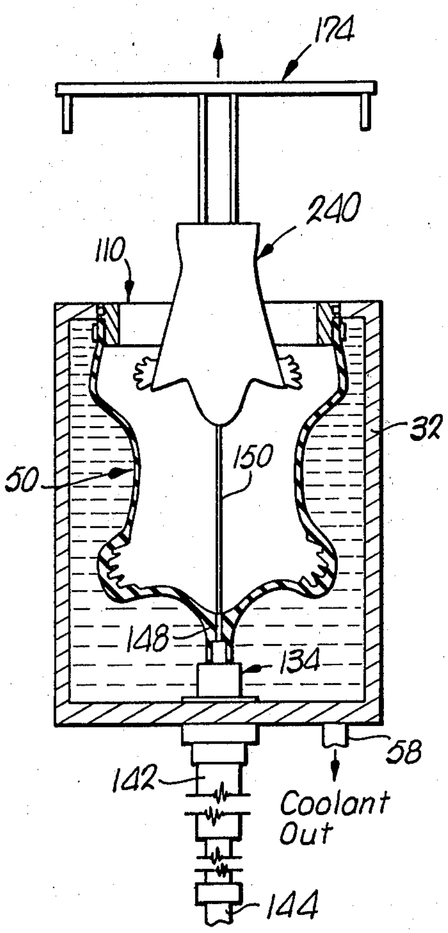
Fig. 18.
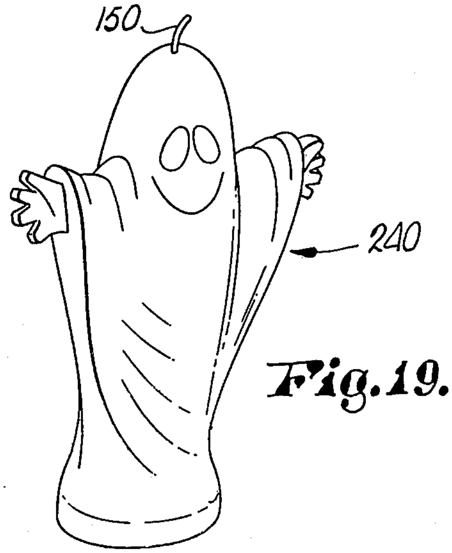
Fig. 19.
Fig. 20.
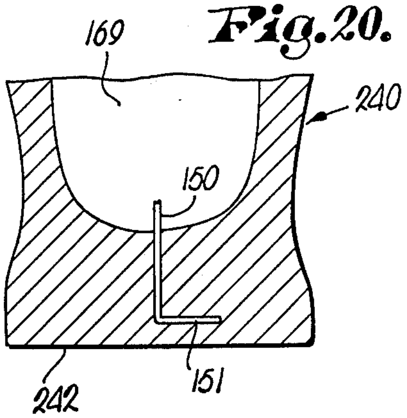

METHOD OF MOLDING AN ARTICLE IN AN EXPANSIBLE MOLD AND REMOVING THE ARTICLE FROM THE MOLD

This application is a continuation-in-part of identically titled application Ser. No. 551,756 filed Feb. 21, 1975, now abandoned.

This invention relates to a method and apparatus for molding seamless, irregularly shaped articles such as wax candles or figurines. More particularly, it is concerned with a commercially feasible method which substantially eliminates costly hand labor and produces molded wax or synthetic resin articles free of surface flaws and the like through utilization of flexible, distensible molds in conjunction with novel fluid apparatus for selectively supporting the mold under the weight of molten wax deposited therein while simultaneously accelerating solidification of the wax, and for effecting differential pressure distension of the mold without causing voids in the fluid chamber in order to greatly facilitate removal of finished articles from the molds.

Commerical producers of molded articles of all types, and especially decorative wax candles, have long recognized the need for a commercial-scale method and apparatus for producing so-called "seamless" molded products. The latter are characterized by the complete absence of a parting line or seam which is an unavoidable defect in articles produced with conventional two-part separable molds. Moreover, in many cases the surface design of molded articles desirably includes many complex countours and deep undercut regions in order to produce the most pleasing aesthetic effects. Such surface designs are especially difficult to consistently duplicate on wax candles and the like and accordingly this problem has presented real difficulties to commercial fabricators.

The traditional method for the production of seamless wax articles includes precasting a regular geometric shape such as a cylinder, cone, cube or pyramid as an inner plug, while the outer surface design is molded as a thin wrap in a shallow die. The wrap is transferred while still malleable and positioned conformably around the plug. After complete hardening of the laminated article any overlap is trimmed. If candles are being produced, a wick canal is then drilled in through the wax body, and a wick inserted therein. The final step involves over-dipping the entire article in wax to complete the same. As can be appreciated, this process is extremely expensive on a commercial scale because of the time-consuming skilled hand labor required, and it has therefore achieved only limited acceptance in the art.

It is also known to utilize flexible, distensible molds in producing seamless articles of all types. These processes generally involve positioning a flexible mold in a specially designed housing, whereupon flowable molding material such as a synthetic resin or wax is poured into the molds and allowed to solidify. At this point the pressure within the housing is reduced to pull the mold away from the cast article to permit removal of the latter.

One process utilizing distensible mold techniques is disclosed in U.S. Pat. No. 2,124,871. In this instance the patentee advocates employment of extremely thin-walled latex rubber distensible molds of approximately 1/16th inch thickness, in conjunction with a vacuum housing for supporting the molds and permitting selective, vacuum-induced distension thereof. While this method and apparatus overcomes some of the problems mentioned, a number of difficulties nevertheless remain. In particular, the extremely thin-walled molds used are extremely prone to tear after only a few molding cycles which of course requires complete refabrication of a new mold. Furthermore, the thin-walled nature of the molds inevitably leads to undesirable distension thereof under the weight of molding material deposited therein which as a consequence produces surface flaws or "pock marks" on the surface of the finished wax article. Finally, this method and apparatus are objectionable by virtue of the extensive hand labor required and because of the cooling time required for solidification of the initially liquid molding material.

Another attempt at providing a satisfactory method for producing seamless wax articles is disclosed in U.S. Pat. No. 3,776,683 to Putzer. The patentee in this case utilizes an extremely thick-walled, elastomeric mold having a thick, annular flange, in conjunction with a vacuum pot for receiving and supporting the mold. While molds in accordance with this invention do not suffer from undue distension under the weight of molding material received therein, a number of other serious objections have arisen in the practical utilization of this method and apparatus. Most important, the extremely thick-walled mold considerably slows solidification of molding material deposited therein which effectively precludes production-line techniques. The thick-walled molds also utilize excessive amounts of raw material in the formation thereof, which inevitably increases mold costs dramatically.

The patents of Andeweg U.S. Pat. No. 3,815,863 and Goldfarb U.S. Pat. No. 3,166,792 disclose molding techniques using flexible, seamless molds. In both of these methods however, effecting distension of the molds is a relatively time-consuming task.

For example, U.S. Pat. No. 3,166,792 suggests initially filling a mold tank with cooling water to enhance solidification of the molding material, whereupon the water is drained from the tank and the molds are manually gripped and pulled apart to permit removal of the molded articles therein. Obviously, this procedure is too uneconomical for use in commercial-scale operations. On the other hand, U.S. Pat. No. 3,815,863 teaches the use of separate fluid pressure and evacuation lines leading to a mold-supporting chamber for alternately pressurizing and evacuating the chamber. This is less than optimum both from a procedural and an equipment cost standpoint, since separate apparatus and method steps are required.

In the case of candle production, all of the patented methods and apparatuses discussed above are deficient because of the lack of any provision for economically wicking the molded articles. In most cases it is necessary to remove the finished wax article and bore the same, followed by manual insertion of a wick, as has been the traditional process. It will of course be appreciated that this wicking technique is not at all feasible for commercial-scale production of decorative candles.

It is therefore the most important object of the present invention to provide a method and apparatus permitting commercial scale production of seamless, irregularly-shaped molded articles such as wax candles and figurines which yield finished products which are free of surface defects and other molding imperfections, eliminate tedious and expensive manual labor and facilitates quick hardening of molten wax during production to significantly reduce costs and fabrication times.

As a corollary to the foregoing it is also an object of the invention to provide a method and apparatus utilizing relatively thin-walled, self-sustaining yet distensible molds which have high heat transfer properties in order to accelerate hardening of initially flowable molding material received therein, in conjunction with housing structure supporting the molds which includes apparatus for the circulation and selective removal of a relatively small amount of a cooling liquid such as water. In this regard, it has been discovered that a small amount of the cooling water can be removed from the housing to effect mold distension without creation of significant fluid-free voids in the housing; thus, it is unnecessary to completely remove the cooling water and separately induce a vacuum within the housing chamber as is common with prior methods, which in turn speeds the molding process and makes it more economical.

Another aim of the invention is to provide a method and apparatus especially adapted for candle-making which includes means for preheating the molds prior to introduction of hot wax thereinto in order to prevent "skinning" or random solidification of the wax prior to even filling of the mold member, and to facilitate the escape of any air entrained in the complex design surfaces and contours of the mold which could cause pock marks or other surface defects on the finished article.

Another object of the invention is to provide seamless candle-forming method and apparatus including as an adjunct thereof selectively operable wicking structure for installation of a central wick within a candle mold during the molding process itself, as opposed to conventional methods of manually boring a hardened candle followed by wick insertion.

Yet another object of the invention is to provide a wax-molding method and apparatus utilizing a distensible mold wherein unique connection structure is provided for positioning the mold within a sealed housing therefor without the need for an integral, annular flange on the mold which increases the cost of the mold itself.

A still further object of the invention is to provide molding apparatus including structure for supporting a central, extruded or compressed wax core or plug within the mold cavity prior to the introduction of molten wax in order that the wax solidifies around the central plug. By provision of this structure cooling time of the molten wax is greatly reduced and the plug, preferably of a lower melting point than that of the liquid wax, enhances the burning characteristics of the final candle.

Finally, it is also an object of the invention to provide a self-extinguishing molded wax candle wherein the central wick thereof terminates above the base of the candle to preclude complete burning of the candle wax which can represent a significant fire hazard.

In the drawings:

FIG. 2 is a vertical sectional view taken along line 2—2 of FIG. 1 and further illustrating the candle molding machine thereof;

FIG. 3 is a horizontal sectional view taken along irregular line 3—3 of FIG. 1 with parts being broken away and removed for clarity;

FIG. 4 is an enlarged, vertical sectional view illustrating one mold assembly of the machine illustrated in FIG. 1 with a supported, central wax plug, molten wax material, and wicking rod assembly positioned within the mold cavity itself;

FIGS. 10–18 are essentially schematic representations illustrating the preferred method steps for production of seamless molten wax articles utilizing the apparatus of FIGS. 1–9;

FIG. 19 is a perspective view depicting the completed seamless wax candle produced by the methods illustrated in FIGS. 10–18; and FIG. 20 is a fragmentary, vertical sectional view of the bottom portion of the candle illustrated in FIG. 19 and illustrating the self-extinguishing feature thereof wherein the central wick terminates above the base of the candle.

Figure 1:
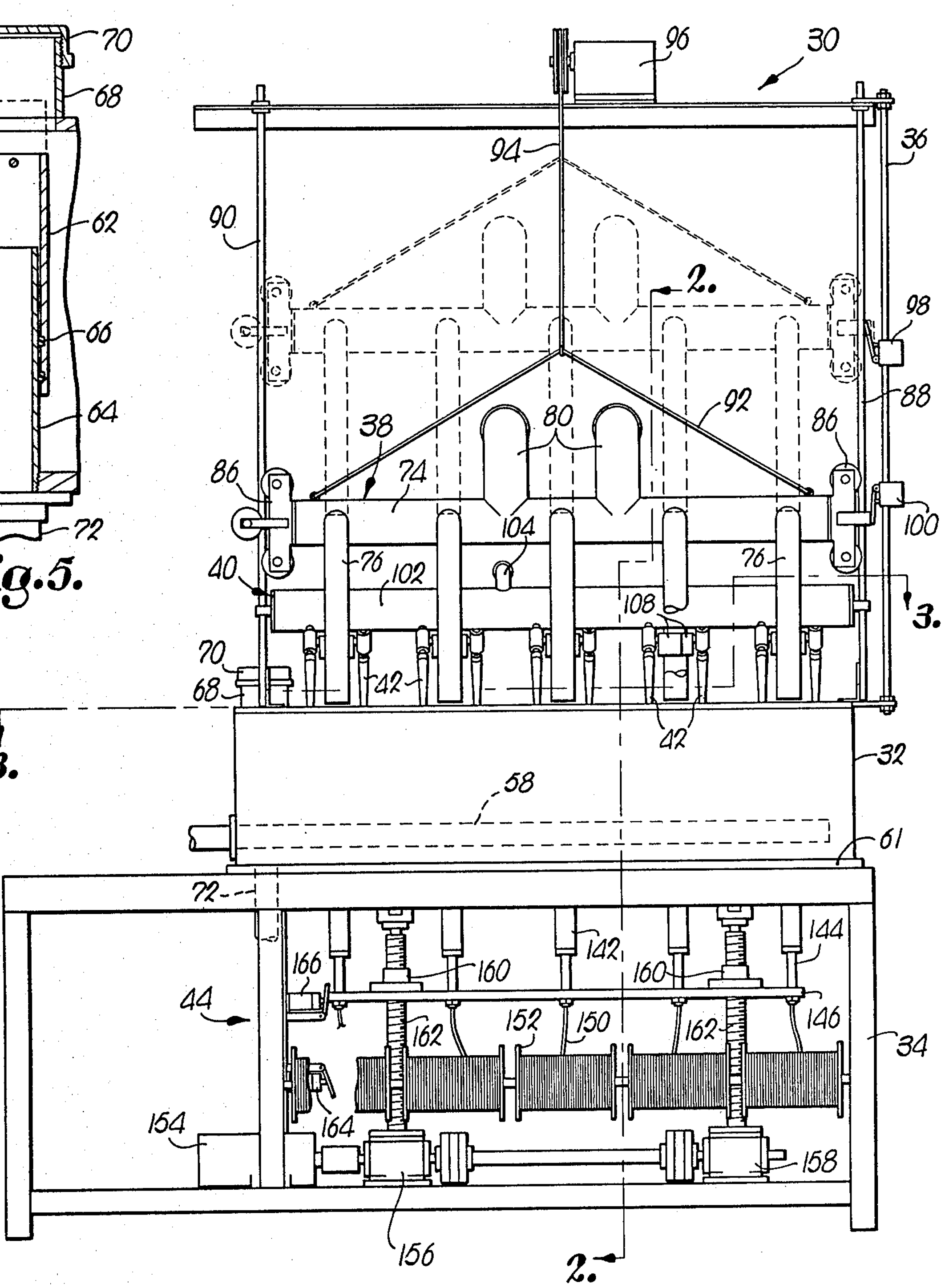
FIG. 1 is a side elevational view of a candle molding machine in accordance with the present invention, shown with the mold preheat mechanism thereof in its operative disposition.

Referring now to the drawings, there is shown in FIG. 1 a molding apparatus 30 for the commercial scale production of seamless, irregularly-shaped articles and particularly wax bodies or candles having an elongated central wick therein. Broadly, apparatus 30 includes a rectangularly-shaped, sealed mold tank 32 supported on conventional frame structure 34 and provided with tubular superstructure 36 thereabove. Hot air preheat means 38 is shiftably supported on superstructure 36 and movable between the operative position shown in bold lines to a recessed position shown in phantom. Hot wax delivery means 40, including a plurality of depending delivery tubes 42, is provided directly above mold tank 32 for the purpose of delivering measured quantities of hot wax to the separate underlying distensible molds. Wicking apparatus 44 is supported on frame structure 34 beneath mold tank 32 for the purpose of wicking the candles produced in apparatus 30 during the molding thereof.

Figure 5:
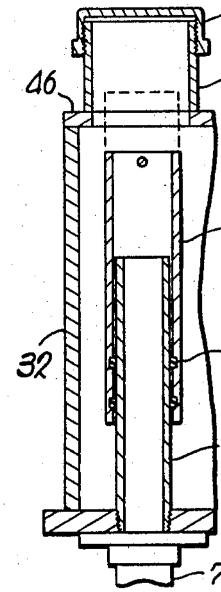
FIG. 5 is a fragmentary, enlarged vertical sectional view illustrating the adjustable, recirculating standpipe structure provided with the vacuum housing of the present candle molding machine.

Referring now to FIGS. 2 and 3, it will be seen that mold tank 32 is an elongated, generally rectangular sealed housing having a top wall 46 provided with a series of ten circular mold-receiving apertures 48. Separate molds 50 are secured at the bases 52 thereof in an inverted position within apertures 48 for the purpose of receiving molten wax. An elongated fluid delivery and removal pipe 58 having a series of apertures 60 throughout its length extends through mold tank 32 adjacent bottom wall 61 of mold tank 32 and is connected to a fluid delivery and removal system later to be described. An adjustable standpipe 62 (see FIG. 5) composed of a pair of telescoping tubular sections 64 and 66 is provided adjacent one end of mold tank 32, and top wall 46 of mold tank 32 includes an upstanding tubular section 68 above standpipe 62 with a threaded cap 70 on section 68 permitting selective access to the standpipe in order to allow the machine operator to vertically adjust the latter as shown in phantom in FIG. 5. The lower end of standpipe 62 communicates with a drain pipe 72 which is connected to the cooling water recirculation system associated with apparatus 30.

Preheat means 38 includes an elongated main air conduit 74 extending the full length of mold tank 32 and situated generally between the two banks of mold-receiving apertures 48. A series of ten depending hot air delivery tubes 76 are connected to main conduit 74 and are configured to extend proximal to the open bases 52 of the respective molds 50 secured within mold tank 32. As best shown in FIG. 2, delivery tubes 76 are arranged in five pairs to correspond to the setting of molds 50. Furthermore, each delivery tube 76 is provided with an internal heating element 78 for the purpose of heating air flowing therepast prior to entrance into the cavities of molds 50. A pair of air delivery conduits 80 are likewise connected to main conduit 74 and extend upwardly therefrom. Conduits 80 merge and are connected to a single flexible hose 82 which is in turn connected to a conventional air blower means 84.

Main air conduit 74 is also provided with a pair of grooved wheel assemblies 86 on each end thereof which ride on elongated, upright tubular tracks 88 and 90 forming a part of superstructure 36. A cable 92 is secured to the respective ends of conduit 74 and is attached to a central second cable section 94 which is in turn attached to winch assembly 96 situated above apparatus 30. A pair of control switches 98 and 100 are also provided on superstructure 36 and positioned for engagement with grooved wheel assemblies 86 during selective up-and-down movements of preheat means 38. Preheat means 38 is thus shiftable between an operative disposition shown in bold lines in FIG. 1 to a recessed, inoperative position shown in phantom.

Hot wax delivery means 40 includes an insulated, elongated manifold 102 fixedly secured to superstructure 36 and extending along the length of mold tank 32 above apertures 48 thereof. A series of ten depending, angularly disposed delivery tubes 42 are connected to manifold 102 and each extends into the open cavity presented by a proximal underlying mold 50. Conventional insulated piping structures 104 and 106 communicate manifold 102 with the remainder of the hot wax delivery and recirculation system later to be described. For the present however, it will be clear that hot wax delivered to manifold 102 in molten condition will be selectively dispensed through depending delivery tubes 42 and thence into the respective molds 50. In order to control this delivery, a valve 108 is provided between each tube 42 and manifold 102 for the purpose of dispensing like quantities of molten wax to the separate molds 50.

Figure 6:
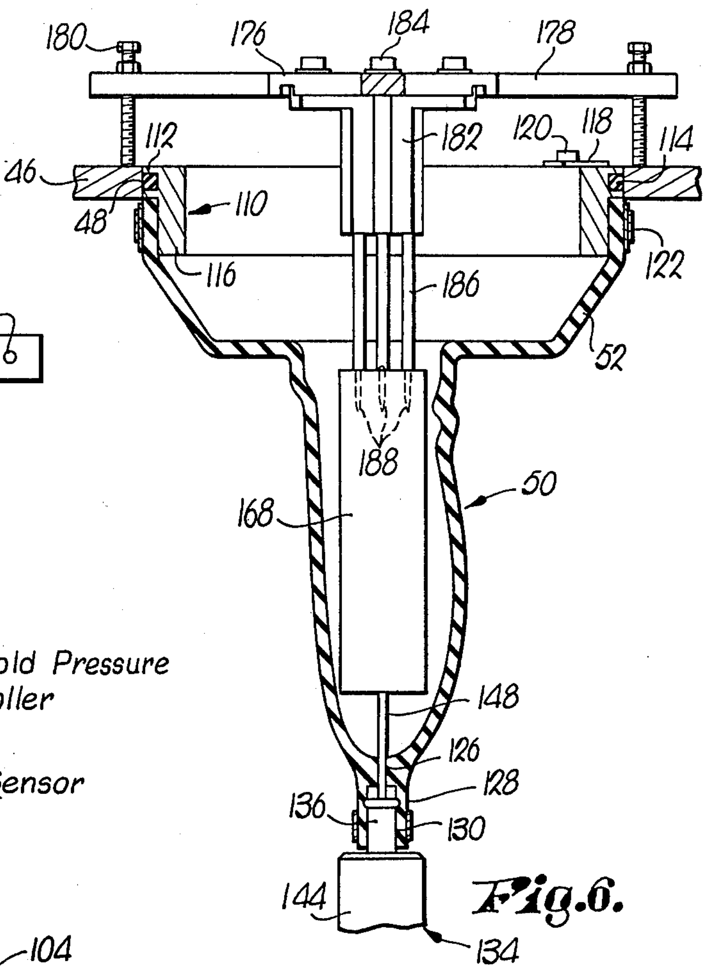
FIG. 6 is an enlarged, fragmentary, vertical sectional view similar to that shown in FIG. 4 but rotated 90° and without molten wax within the mold.

Turning now to FIGS. 4 and 6, it will be seen that each mold 50 is an integral distensible member preferably formed of silicone rubber or the like which is resilient and has an excellent "memory" for repeated return to its original configuration after distension. Each mold 50 has a radially expanded, annular base portion 52 having somewhat thicker walls than the design section of the mold, and an elongated, enlarged head portion 128 at the normal top thereof. Head portion 128 of each mold 50 includes an axial, enlarged bore 130 in communication with a concentric wick-receiving aperture 126 provided in the apex of the mold. The base portion 52 of each mold 50 is flangeless in construction and is positioned within a corresponding mold-receiving aperture 48 in top wall 46 by provision of an annular metallic rim 110 secured within the aperture. Each rim 110 includes a radially projecting annular segment 112 in sealing engagement with the upper margin of top wall 46 defining aperture 48 and a depending annular wall portion 116 which circumscribes the interior surface of the base portions 52 of an associated mold 50. Additionally, a conventional O-ring seal 114 is interposed between each rim 110 and aperture sidewall to ensure maintenance of a proper vacuum-tight seal therebetween. Rims 110 are removably secured in position within the respective apertures 48 by provision of annular rings 118 and securement screws 120, and connection of corresponding molds 50 and rims 110 is completed through the use of annular metallic clamps 122 which circumscribe the respective mold bases 52 and are adjustable by means of threaded tightening screws 124.

Each mold 50 is positioned in an inverted fashion within mold tank 32 with head portion 128 thereof secured to bottom wall 61 of the mold tank. For this purpose a series of ten elongated, vertically shiftable connection members 134 are positioned within bottom wall 61 for attachment with respective mold head portion 128. Each connection member 134 includes an uppermost, axially bored projection 136 configured for reception within an enlarged bore 130 of a proximal mold head portion 128. Securement of each projection 136 within a corresponding bore 130 is completed through the use of annular, adjustable clamps 138. Additionally, each connection member 134 includes an elongated, tubular depending body portion 142 which extends through mold tank bottom wall 61 and is received by a respective bushing 140 secured in bottom wall 61. An O-ring seal 141 is received within an appropriate recess in each bushing 140 for the purpose of maintaining a vacuum-tight seal between the bushing and associated member 134 during shifting of the latter.

The respective tubular body portions 142 of connection members 134 each telescopically receive an elongated, shiftable, axially bored wicking element 144 at the lower open ends thereof, and all of the elements 144 are threadably coupled at their lowermost ends to a single shiftable plate 145. Each wicking element 144 includes an elongated, tubular wicking rod 148 mounted at the upper end thereof with the bore of rod 148 being coaxially aligned with the somewhat larger diameter bore 145 of wicking element 144. The end of a continuous strand of burnable wick 150 is received within each wicking element 144 and threaded upwardly through coaxial wicking rod 148 for the purpose of providing a wick for a candle body produced within mold 50. Referring to FIGS. 1 and 2, it will be seen that a separate spool 152 of wicking material is provided for each wicking element 144, and to facilitate wicking operations the spools 152 are rotatably secured within frame structure 34 with the leading ends thereof extending through the respective wicking elements 144 and wicking rods 148. Additionally, a drive motor 154 in conjunction with gear reduction boxes 156 and 158 is provided for selective vertical movement of plate 145 which in turn causes simultaneous movement of all of the wicking elements 144 secured thereto. Plate 146 includes a pair of thrust nuts 160 which receive separate, threaded drivescrews 162. Thus, plate 146 is selectively vertically movable simply by actuating motor 154 to drive plate 146 up or down. This movement is controlled by conventional on-off switches 164 and 166 which limit the possible movement of plate 146.

In many candle-making applications it is desirable to utilize precast wax cores or plugs 168 which are inserted within the separate molds 50 prior to introduction of molten wax 170. As best shown in FIG. 4, the plugs 168 (which can be either extruded or compressed wax members) include central bores or canals 172 of sufficient diameter to receive a wicking rod 148. In this manner, a plug 168 can be telescopically positioned over each rod 148 when the rods are shifted to a position within the cavity of mold 50, whereupon molten wax 170 can be poured into the mold and allowed to solidify.

Figure 7:
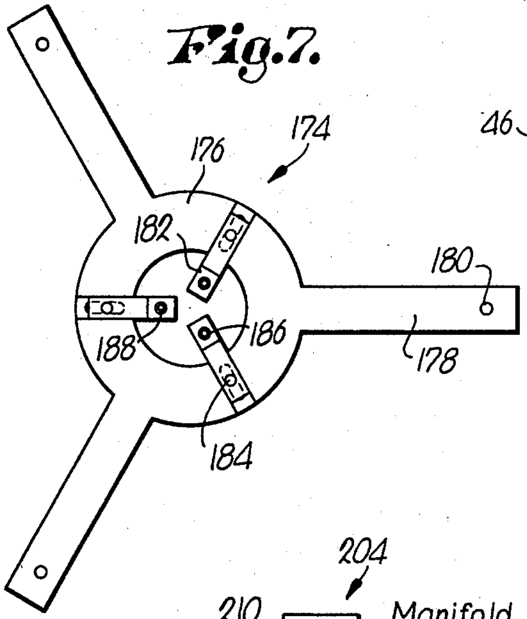
FIG. 7 is a bottom plan view of the plug support structure depicted in FIGS. 4 and 6.

Unique support structure 174 (see FIG. 7) is provided for supporting a plug 168 within each of the several molds 50. In particular, each of the separate support structures 174 includes an annular central portion 176 and a set of three radially outwardly extending arms 178. Arms 178 are bored adjacent the outermost extremities thereof and provided with mounting screws 180 for the purpose of securing support structure 174 within top wall 46 of mold tank 32 above a respective mold 50. For this purpose, top wall 46 of mold tank 32 is tapped adjacent each aperture 48 to provide a means of indexing each support structure 174 and insuring that plugs 168 are centrally disposed within the cavities of molds 50. The central portion 176 of each support structure 174 include three-prong supports 182 which are adjustably affixed thereto by means of conventional metal screws 184. A depending plug-supporting prong 186 is attached to each element 182 and has a sharpened lowermost end 188 for insertion within the precast wax plug 168. Thus, when it is desired to utilize the central plug 168 it is only necessary to secure the same to the sharpened ends 188 of plug-supporting prongs 186 whereupon the plug can be correctly positioned within mold 50 simply by securing screws 180 into tapped bores of top wall 46.

Figure 8:
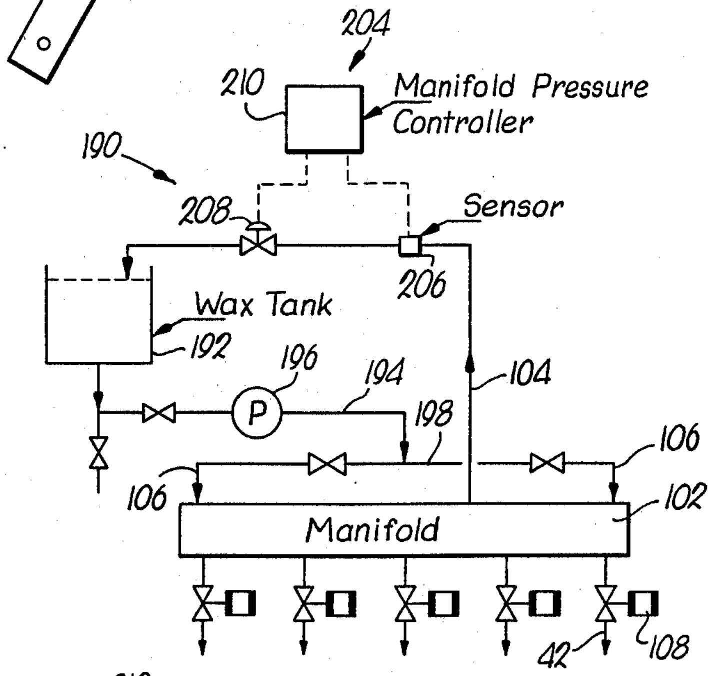
FIG. 8 is a schematic representation illustrating the wax delivery and recirculation system provided with the molding machine of FIG. 1.

Apparatus 30 includes as an adjunct thereof a hot wax delivery and recirculation system designated generally by the numeral 190 (see FIG. 8). System 190 includes primary manifold 102, along with the described depending delivery tubes 42 and valves 108. In addition, the system is provided with a wax heating tank 192 and a delivery conduit 194 with a pump 196 of 5 gallons per minute capacity interposed therein. The pumping capacity of pump 196 is preferably greater than the maximum discharge capacity of tubes 42 in order to maintain a constant head on the pump during operation. Conduit 194 is in communication with secondary delivery conduit 198 downstream of pump 196, and conduit 198 includes ducts 106 at respective ends thereof for delivering an even flow of hot molten wax to manifold 120. A return conduit 104 is interconnected between manifold 102 and wax tank 192 for delivering excess wax back to tank 192 for reheating and permitting recirculation thereof throughout the entire system 190. A manifold pressure control system 204 is interposed within conduit 104 and includes a sensor 206, valve 208, and pressure controller 210. System 204 is operable to maintain a constant fluid pressure within manifold 102 in order to assure uniform delivery of molten wax to each of the depending delivery tubes 42. Of course, system 190 could be modified or replaced as necessary for the delivery of other molding materials such as synthetic resins to the respective molds 50.

Figure 9:
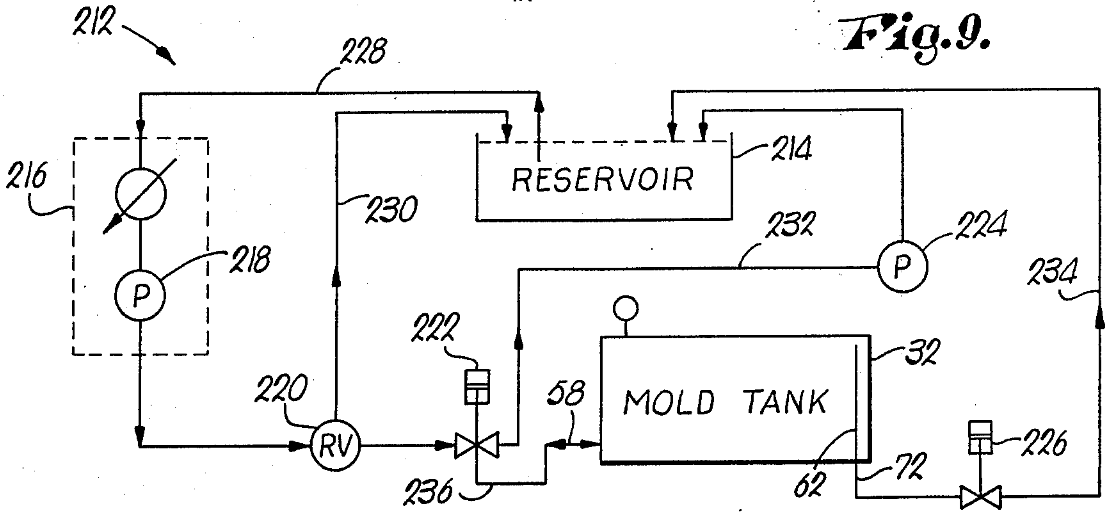
FIG. 9 is an essentially schematic flow diagram illustrating the cooling liquid delivery, recirculation and removal system associated with the overall molding apparatus.

Apparatus 30 also includes a cooling liquid delivery, recirculation and removal system designated by the numeral 212 and illustrated schematically in FIG. 9. System 212 includes mold tank 32, cooling liquid reservoir 214, heat exchanger 216 including pump unit 218, relief valve 220, three-way valve 222, return pump 224, and recirculation valve 226. A first delivery conduit 228 interconnects reservoir 214 and three-way valve 222 and has heat exchanger 216 interposed therein for cooling the liquid from reservoir 214 prior to introduction into mold tank 32. In addition, relief valve 220 is interposed within conduit 228 downstream of heat exchanger 216, and a relief conduit 230 interconnects valve 220 and reservoir 214. A direct return conduit 232 interconnects three-way valve 222 and reservoir 214, and furthermore includes pump 224 interposed therein. Finally, drain pipe 72 connected to standpipe 62 is interconnected with recirculation conduit 234 which likewise terminates at reservoir 214, and a conduit 236 is provided between valve 222 and pipe 58.

OPERATION

In accordance with the invention, it is possible to utilize the above described apparatus in the preparation of seamless, irregularly shaped molded wax articles such as candles or the like which are substantially free of surface defects or other molding irregularities. For purposes of illustration, the following discussion (illustrated in FIGS. 10–18) will center around production of "ghost" candles having an irregular shape and complex design contour. Of course it will be recognized that other shapes or candles and/or figurines can be produced in accordance with these methods simply through the utilization of other types of distensible mold members and molding materials. Such alterations will be apparent to those skilled in the art and need not be discussed in detail herein.

Figure 10:
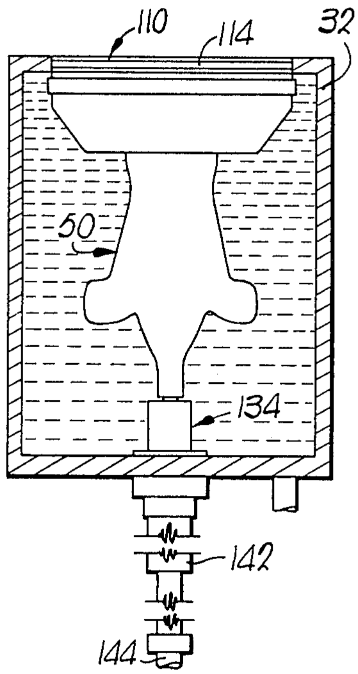
Figure 11:
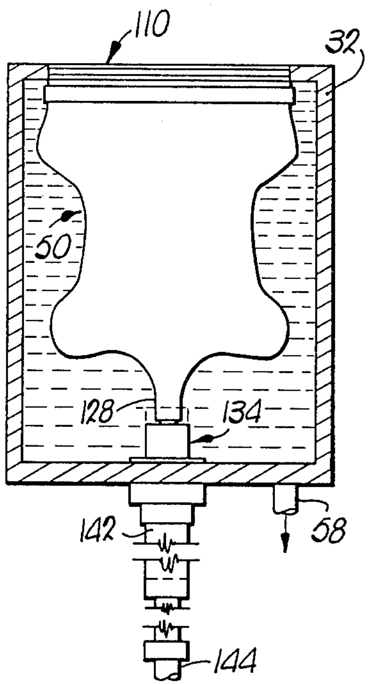

Referring first to FIG. 10, there is shown the appropriate mold 50 positioned within mold tank 32 in accordance with the apparatus described hereinabove such that the base portion 52 thereof is open and terminates at the approximate horizontal level of top wall 46 of mold tank 32. The unit is shown filled with cooling water (which may optionally contain corrosion inhibitors or other additives) prior to removal of a completed molded article therefrom.

The first step in new cycle of candle formation involves pumping a relatively small portion of the cooling liquid from mold tank 32 which in turn reduces the pressure on the molds 50 for causing distension thereof to facilitate removal of completed candles therefrom. In this connection, it is important to note that there is no necessity of completely removing the water from tank 32 for causing mold distension. To the contrary, it has been discovered that removal of only a small portion of this fluid without creation of significant fluid-free voids within the chamber (see FIG. 11) is effective for distending the molds 50. In practice, the molds 50 distend to an extent sufficient to take up the volume of water removed from tank 32, so that the tank remains essentially completely full of water at all times.

Such liquid removal is accomplished by turning three-way valve 222 to the fluid-return position thereof for opening return conduit 232, whereupon recirculation valve 226 is closed. At this point pump 224 is actuated to draw a relatively small amount of liquid from tank 32 through pipe 58, conduit section 236, three-way valve 222, and return conduit 232 for return to reservoir 214. This causes the molds 50 to distend sufficiently to take up the volume of tank 32 normally occupied by the removed water. It is to be noted in this respect that during such distension connection members 134 attached to the head portions 128 of mold members 50 shift downwardly within respective bushings 140 in order to accommodate distension of the mold.

Figure 12:
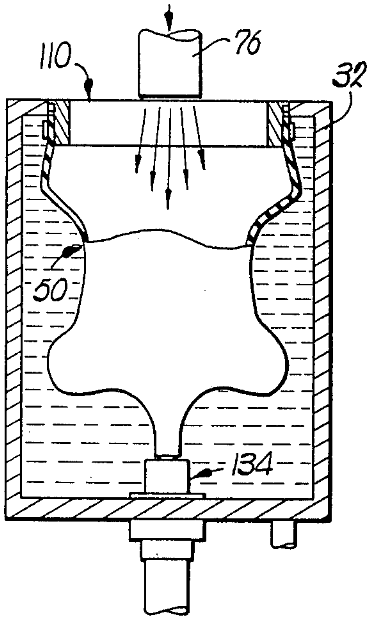

Upon removal of the completed candles from molds 50, preheat means 38 is lowered to its operative disposition through utilization of winch assembly 96. In particular, winch assembly 96 is actuated to lower main conduit 74 through the medium of wheel assemblies 86 until depending delivery tubes 76 are positioned adjacent the underlying molds 50. At this point the right-hand wheel assembly 86 contacts switch 100 to stop winch assembly 96 and preclude further downward movement of preheat means 38. Blower 84 and the respective heating elements 78 are next actuated, causing hot air blasts to be delivered to each of the separate molds 50. When the latter are sufficiently heated, blower 84 and heating elements 78 are turned off and winch assembly 96 again actuated to raise the entire preheat assembly until the right-hand wheel assembly 86 thereof contacts upper switch 98 which is likewise operable to shut down the winch assembly and stop upward movement of preheat means 38. The preheating step is illustrated in FIG. 12, and it is to be noted that the cooling water remains within and substantially fills the tank 32 during the procedure as well as during all steps where the molds 50 are distended.

Preheating of the design cavities of molds 50 has a number of advantageous effects. First of all, preheating substantially prevents molten wax from "skinning" or solidifying along the interior design surfaces of molds 50 prior to complete filling thereof with the wax. As can be appreciated, if wax forms a premature semisolid "skin" on the inner design surfaces of the mold prior to complete filling of the latter, true reproduction can be difficult to achieve and surface flaws can become evident on the final product. This is especially true in the case of complex designs which are more prone to such problems by virtue of the irregular surface contours thereof. The use of hot preheating air also facilitates the escape of any entrained pockets of cold air from the complex design surfaces of the molds in order to minimize pinhole defects in the finished product. Specifically, any such air can travel upwardly through the initially fluid wax for escape to the atmosphere and not be entrapped in a semi-solid surface skin of wax. Finally, it has been discovered that the preferred silicone rubber distensible molds oftentimes require preheating in order to ensure that the wax evenly and fully spreads over the mold surface without formation of voids or the like. In practice, it has been found that preheating times vary depending upon the size, design complexity and type of molds being employed; with the depicted silicon rubber molds a 2 minute treatment with air heated to about 300° F. has proven to be satisfactory.

Figure 13:
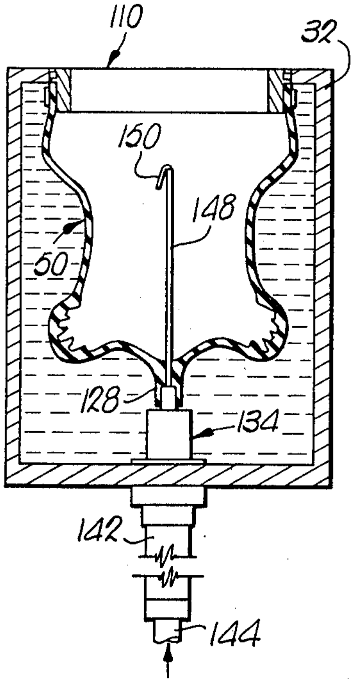
Figure 14:
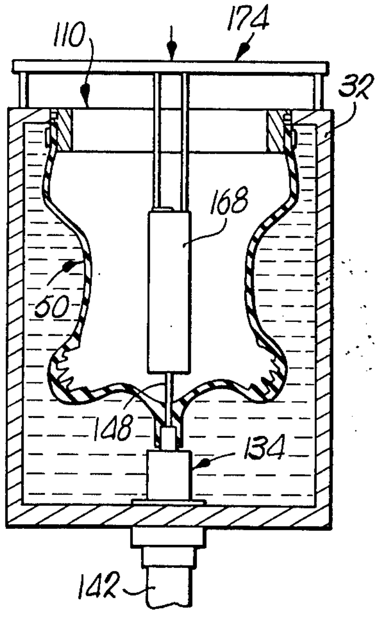
Figure 15:
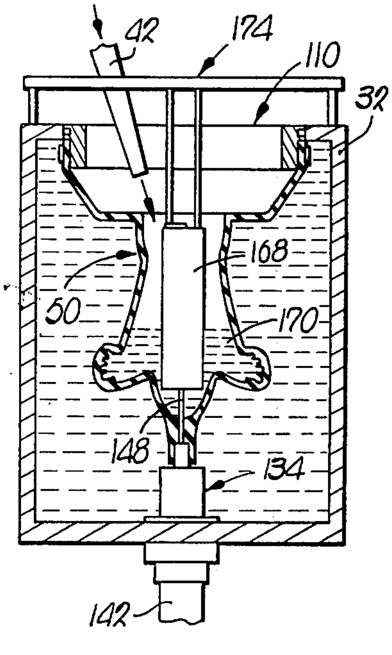

The next step illustrated in FIG. 13 involves placement of a wick section within mold 50. For this purpose, motor 154 is actuated which acts through drive-screws 162 and plate 146 to elevate the wicking elements 144. This has the effect of shifting the elements 134 upwardly and pushing the respective wicking rods 148 through the bored projections 136 and wick-receiving apertures 126 of the separate molds. Since the rods 148 telescopically receive separate sections of wick material 150, the latter are carried into the cavities of molds 50. It is to be noted in this respect that the terminal portion of the wick sections extend somewhat beyond the uppermost extremity of wicking rod 148 to define a "tail" 151 of wick 150 within mold 50.

A precast wax central core or plug 168 is next positioned over each wicking rod 148 such that the tail of wick material extends above the plug. For this purpose, the separate support structures 174 each having a plug 168 connected thereto as illustrated in FIGS. 4 and 6 are set into place on mold tank 32. This has the effect of telescopically positioning plug 168 about wicking rod 148 and centrally disposing the plugs within the molds 50.

At this point the pressure within mold tank 32 is returned to normal by reintroducing cooling fluid back into tank 32 until the molds 50 return to their original undistorted configuration. This is accomplished by turning valve 222 to open conduit 236 and close conduit 232, whereupon pump 218 is actuated to draw liquid from reservoir 214 and deliver the same through line 228, valves 220 and 222, conduit 236 and pipe 58 to tank 32. This has the effect of returning the molds 50 to their original configurations while being constantly supported by the liquid within tank 32.

Wax material is next introduced into each mold 50 by actuating the valves 108 and permitting a timed amount of molten wax to flow into each of the molds. By virtue of utilization of a recirculating wax delivery system 190 having a predetermined, essentially constant back pressure on pump 196, a linear flow of wax over time results permitting an accurate timed wax fill of molds 50. After filling, the molds 50, although relatively thinwalled for rapid heat transfer, retain their shapes and do not perceptibly distend under the weight of molten wax 170. This is further assured by virtue of the presence of the liquid within tank 32. Moreover, by virtue of the preheating step, the molten wax 170 does not form any substantial "skin" which could lead to the design flaws alluded to previously.

In order to facilitate cooling of molten wax 170 while simultaneously supporting molds 50 against undue distension under the weight of the wax, the cooling liquid within mold tank 32 is preferably continually recirculated therethrough (see FIG. 17). This is accomplished by opening recirculation valve 226 and starting pump 218. This has the effect of drawing liquid (cooled by passage through heat exchanger 216) from reservoir 214 to mold tank 32. Recirculation without undesirable turbulence occurs through standpipe 62 and conduit 234, and in this connection standpipe 62 is adjusted to maintain the water level within mold tank 32. Cooling liquid is thus continually recirculated through mold tank 32 for a period of time sufficient to harden initially molten wax 170 to form a completed candle, while the tank remains essentially free of liquid-free voids.

During the solidification process when wax 170 is essentially hardened, the wicking rods 148 are withdrawn from molds 50 by actuating motor 154 to lower plate 146 and wicking elements 144 attached thereto. In this regard, wicking rod removal is not undertaken until the uppermost tail of wick 150 is solidified within wax 170 to a point to hold the wick within the candle, as will be readily understood.

Following solidification of the wax within molds 50 to form completed candles 240 which are faithful reproductions of the molds, a relatively small portion of the liquid within housing 32 is withdrawn through pipe 58 and returned to reservoir 214 as discussed above. This has the effect of again distending molds 50 to an extent permitting easy removal of candles 240 therefrom without, of course, creating liquid-free voids in tank 32. As illustrated in FIG. 18, each candle 240 is most easily removed simply by grasping support structure 174 and pulling the same upwardly with the candle still attached thereto. At this point it is only necessary to snip wick material 150 at a level slightly above the top of candle 240, remove support structure 174 from the latter, and finish the base of candle 240.

A ghost candle 240 produced in accordance with the described methods is illustrated in perspective in FIG. 19. By virtue of the unique apparatus and methods employed, candle 240 is virtually free of surface defects such as pock marks or pinholes, and is in every way a commercially acceptable article. Additionally, because of the unique wicking apparatus employed, the tail 151 of wick material 150 is at a level slightly above the base 242 of candle 240 (see FIG. 20). This has the effect of producing a self-extinguishing candle which eliminates a fire hazard commonly encountered with conventional candles. In particular, during burning of candle 240 near the base thereof, when the trailing tail portion of wick 150 is reached no further burning of the candle wax can occur and therefore the candle is self-extinguishing.

In practice, it has been found that plug 168 is advantageously formed of a wax having a lower melting point than that of wax 170 forming the outermost part of the candle. This has the effect of creating a central depression or cavity during burning of the candle to inhibit flow of melted wax over the sides of the candle which can destroy the appearance thereof and create a significant safety hazard. In this respect the plug is preferably formed of CB-39 candle wax (purchased from American Oil Co. of Whiting, Ind.) having a melting point of about 131° F., while a 50–50 mixture of White Microwax (purchased from the Bareco Corporation of Tulsa, Okla.) and having a melting point of about 180° F. and CB-39 candle is utilized in the outer, high-melt molded portion of the candle.

Having thus described the invention, what is claimed as new and desired to be secured by Letters Patent is:

1. A method of molding seamless, irregularly-shaped articles, comprising the steps of:

providing a distensible mold member having a cavity therein conforming to the shape of the article to be molded;

positioning that portion of said mold member which requires distension for removal of a molded article therefrom within a sealed housing defining a chamber for said mold member portion;

introducing flowable molding material into said cavity;

filling said chamber with liquid for supporting said mold member against distension under the weight of said molding material received within said cavity and for accelerating the cooling and solidification of said molding material therewithin;

permitting said molding material to solidify to form a molded article within said cavity;

removing a sufficient amount of fluid from said chamber under conditions to effect differential pressure distension of the mold member to an extent to permit removal of the molded article therefrom and without creating significant, fluid-free voids within said chamber; and removing said molded article from said distended mold member.

2. The method as set forth in claim 1 wherein said molding material is wax and including the step of preheating said mold member prior to introduction of said molten wax molding material thereinto.

3. The member as set forth in claim 2 wherein is included the step of directing heated air into said cavity to preheat said mold member.

4. The method as set forth in claim 2 wherein is included the step of positioning a solid plug of wax material within the confines of said cavity prior to introduction of said molten wax material thereinto such that the latter solidifies around said plug.

5. The method as set forth in claim 1 wherein is included the step of continually recirculating said liquid through said housing chamber during solidification of said molten wax molding material while keeping the chamber essentially full of liquid.

6. The method as set forth in claim 5 is included the step of utilizing cooled water as said recirculating liquid.

7. A method of molding seamless, irregularly-shaped wax candles having a central wick therein, comprising the steps of:

providing a distensible mold member having a cavity therein conforming to the shape of the candle to be molded and a wick-receiving aperture through the wall thereof in communication with said cavity;

positioning the apertured portion of said mold member which requires distension for removal of a molded candle therefrom with a sealed housing defining a chamber for said mold member portion, positioning within said cavity an elongated wick which extends through said aperture;

introducing molten wax molding material into said cavity and about said wick;

filling said chamber with liquid for supporting said mold member against distension under the weight of said wax molding material received within said cavity and for accelerating the cooling and solidification of said molding material therewithin;

permitting said molten wax molding material to solidify to form a molded candle within said cavity;

removing a sufficient amount of fluid from said chamber under conditions to effect differential pressure distension of the mold member to an extent to permit removal of the molded candle therefrom and without creating significantly fluid-free voids within said chamber; and removing said molded candle from said distended mold member.

8. The method as set forth in claim 7 including the step of preheating said mold member prior to introduction of said molten wax molding material thereinto.

9. The method as set forth in claim 8 including the step of directing heated air into said cavity to preheat said mold member.

10. The method as set forth in claim 7 including the step of positioning said mold member by attaching the base and top thereof to opposite walls of said housing, there being an aperture through the wall of said housing proximal to said mold top in communication with the wick-receiving aperture of the latter.

11. The method as set forth in claim 10 including the steps of inserting an elongated, hollow wick-supporting rod having said wick received therein through said housing and wick-receiving apertures prior to introduction of molten wax molding material into said cavity, and retracting said rod after said molding material has solidified to an extent to retain said wick therewithin.

12. The method as set forth in claim 11 including the step of positioning a plug of wax material over said wicking rod and within the confines of said cavity prior to introduction of said molten wax molding material into said cavity.

13. The method as set forth in claim 7 wherein is included the step of continually recirculating said fluid through said housing chamber during solidification of said molten wax molding material while keeping the chamber essentially full of liquid.

14. The method as set forth in claim 13 wherein is included the step of utilizing cooled water as said recirculating liquid.

* * * * *